United States Patent
Indlekofer

(10) Patent No.: US 7,421,872 B2
(45) Date of Patent: Sep. 9, 2008

(54) SHOT-BLASTING INSTALLATION FOR BLASTING WORK PIECES MADE FROM LIGHT METAL ALLOYS

(75) Inventor: Markus Indlekofer, Klettgau (DE)

(73) Assignee: Disa Industrie AG, Schaffhausen (CH)

( * ) Notice: Subject to any disclaimer, the term of this patent is extended or adjusted under 35 U.S.C. 154(b) by 57 days.

(21) Appl. No.: 11/405,849

(22) Filed: Apr. 17, 2006

(65) Prior Publication Data
US 2006/0236738 A1    Oct. 26, 2006

(30) Foreign Application Priority Data
Apr. 21, 2005  (EP) .................................. 05008721

(51) Int. Cl.
*B23C 3/18*    (2006.01)
*B24C 1/10*    (2006.01)
(52) U.S. Cl. ............................... 72/53; 29/90.7; 451/38
(58) Field of Classification Search ............... 72/53; 451/38, 39; 29/90.7
See application file for complete search history.

(56) References Cited

U.S. PATENT DOCUMENTS

| | | | | |
|---|---|---|---|---|
| 3,423,976 A | * | 1/1969 | Burney et al. ................ | 72/53 |
| 3,566,644 A | * | 3/1971 | Moore ......................... | 72/53 |
| 3,668,912 A | * | 6/1972 | Baughman et al. ............ | 72/53 |
| 3,690,066 A | | 9/1972 | Rowe | |
| 3,705,510 A | * | 12/1972 | Baughman .................... | 72/53 |
| 4,456,293 A | | 6/1984 | Panissidi | |
| 4,604,881 A | * | 8/1986 | Lienert ........................ | 72/53 |
| 4,694,672 A | * | 9/1987 | Baughman .................... | 72/53 |
| 5,014,469 A | | 5/1991 | Watts | |
| 5,590,703 A | | 1/1997 | Eckert | |

FOREIGN PATENT DOCUMENTS

| | | |
|---|---|---|
| EP | 0 145 851 | 9/1984 |
| EP | 0 248 096 | 12/1987 |
| GB | 374901 | 3/1964 |
| JP | 04-171177 | 6/1992 |
| JP | 10-118935 | 5/1998 |
| JP | 10-118935 | * 12/1998 |

* cited by examiner

*Primary Examiner*—David B Jones
(74) *Attorney, Agent, or Firm*—Bachman & LaPointe, P.C.

(57) ABSTRACT

A shot-blasting installation (1) for blasting work pieces (30) made from light metal alloys, comprising at least one blasting chamber (3) for receiving the work pieces that are to be blasted, at least two blasting wheels (6) arranged in walls of the blasting chamber for introducing a blasting agent into the blasting chamber, and a separator (8) for separating the mixture of blasting agent and material that has been removed by blasting, wherein the separator (8) is arranged directly beneath the blasting chamber (3), and wherein a manipulator (10) for handling the cast work piece (30) during blasting is arranged in the blasting chamber (3).

20 Claims, 6 Drawing Sheets

SHOT-BLASTING INSTALLATION FOR BLASTING WORK PIECES MADE FROM LIGHT METAL ALLOYS

BACKGROUND OF THE INVENTION

The invention relates to a shot-blasting installation for blasting work pieces made from light metal alloys, comprising at least one blasting chamber for receiving the work pieces that are to be blasted, at least two blasting wheels arranged in walls of the blasting chamber for introducing a blasting agent into the blasting chamber, and a separator for separating the mixture of blasting agent and material that has been removed by blasting.

To enable as much weight as possible to be saved, cast work pieces made from light metal alloys, in particular made from aluminium and magnesium alloys, are increasingly being used in motor vehicle construction. The work pieces, which are produced by die-casting or sand-casting processes, have to be deburred and cleaned after casting. After the casting operation, the work pieces often have an uneven and irregular outer surface. To improve the appearance of the work pieces, the outer surfaces have to be ground, polished and/or blasted. Blasting with particulate blasting agents can also be used to alter the physical structure at the surface of the cast work piece. By way of example, it is possible to compact or harden the cast workpiece at the surface and make it more resistant to abrasion or to improve its sliding properties.

U.S. Pat. No. 5,014,469 has disclosed a blasting installation comprising a blasting chamber with two blasting wheels, an expansion chamber, a conveyor installation and a separator. The work pieces which are blasted in the blasting chamber are plates or metal sheets which are passed through the blasting chamber over a roller conveyor. The mixture of blasting agent and material removed by blasting is blown off the surface of the work piece and passed via a metal diverter sheet into a space with a conveyor installation. As it drops off the metal diverter sheet, the mixture is first of all separated into a stream comprising coarser, heavier material and a stream comprising finer, lighter material. The heavier material is fed via the conveyor installation to an additional separator. In the separator, which is arranged above the blasting chamber, the second actual separating-off of the blasting agent is carried out. The lighter material is sucked out or separated off by a blower via an expansion chamber in a separating cyclone and a dust collector.

Working on the basis of this prior art, it is an object of the invention to provide a shot-blasting installation which has the simplest possible construction and ensures operation is as reliable and safe as possible in particular for work pieces made from magnesium alloys.

SUMMARY OF THE INVENTION

This object is achieved by a shot-blasting installation for blasting work pieces made from light metal alloys, comprising at least one blasting chamber for receiving the work pieces that are to be blasted, at least two blasting wheels arranged in walls of the blasting chamber for introducing a blasting agent into the blasting chamber, and a separator for separating the mixture of blasting agent and material that has been removed by blasting, wherein the separator is arranged directly beneath the blasting chamber, and wherein a manipulator for handling the cast work piece during blasting is arranged in the blasting chamber.

It is advantageous that the cast work pieces can be blasted as uniformly as possible on all sides with the blasting agent. This is achieved by virtue of the fact that the manipulator is designed as a gripper with three directions of movement. This is also achieved by virtue of the fact that the gripper is formed with servomotors and pneumatic cylinders. The servomotors of the gripper are connected to a computer system for controlling all the movements of the work piece. The computer control ensures that regions of the work piece which require more intensive exposure to the blasting agent can remain exposed to the blasting agent for longer than the other regions.

Another advantage is that the blasting installation can be operated as far as possible without manual labour. This is achieved by virtue of the fact that a loading and unloading robot is arranged so as to load and unload the work pieces that are to be blasted into and from the blasting chamber.

A further advantage is that the magnesium dust which is produced as material removed by blasting has the shortest possible residence time in the blasting installation and that the formation of explosive mixtures in the blasting installation is prevented. This is achieved by virtue of the fact that the separator is arranged directly beneath the blasting chamber, i.e. at the outlet for the used blasting agent. The separator is formed without spaces and surfaces which promote accumulations of the magnesium dust under the prevailing fluid-dynamic conditions. This is also achieved by virtue of the fact that the separator has a baffle plate with a width corresponding to the width of the blasting chamber.

BRIEF DESCRIPTION OF THE DRAWINGS

An exemplary embodiment of the invention is described with reference to the figures, in which.

DETAILED DESCRIPTION

Figure 1:
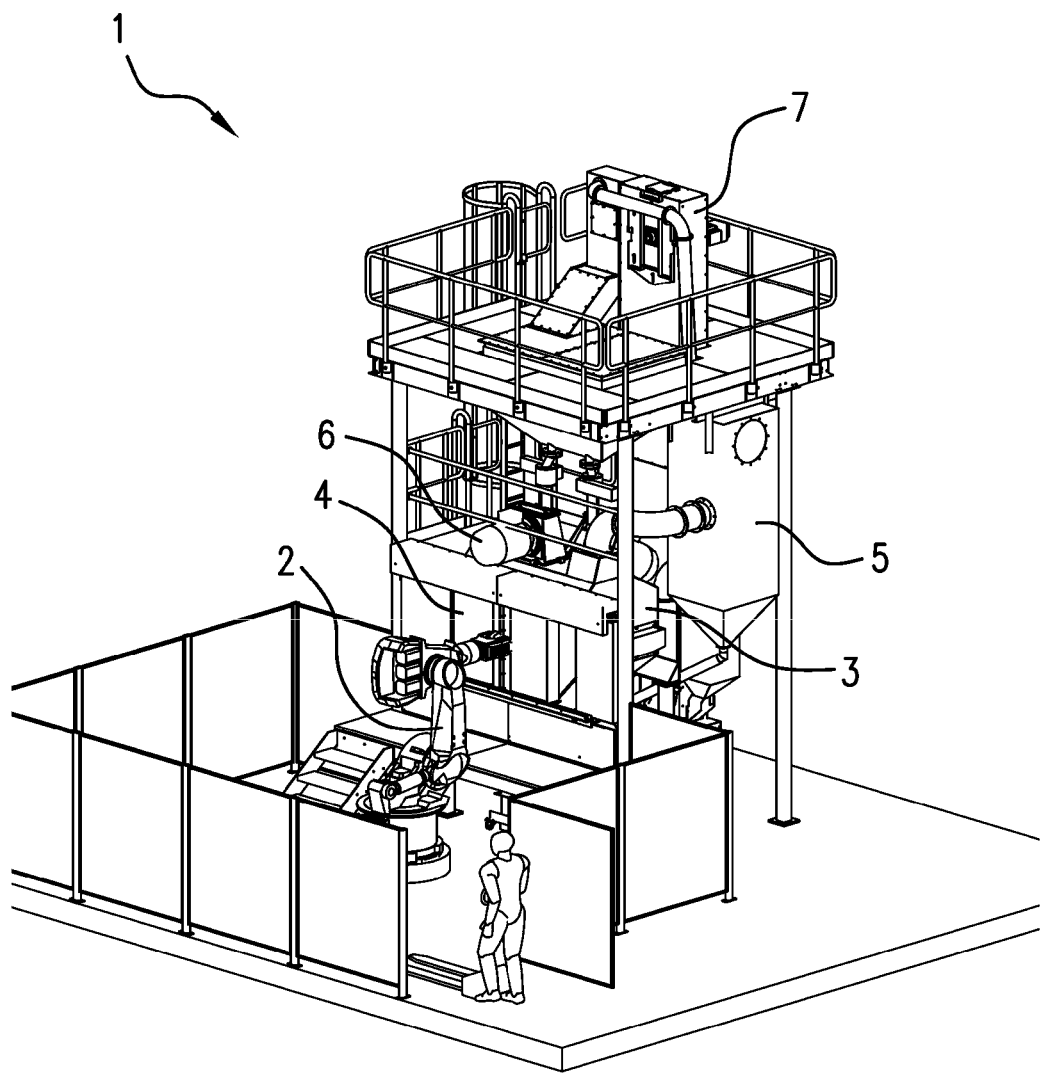
FIG. 1 shows a perspective view of a shot-blasting installation according to the invention.

FIG. 1 illustrates a shot-blasting installation 1 for blasting work pieces made from light metal alloys, in particular for blasting cast work pieces made from magnesium alloys. The installation 1 comprises a loading and unloading robot 2, a blasting chamber 3 and a sliding door 4 which is used as access to the actual blasting chamber 3, a manifold 5 for all the pipelines of the blasting installation which carry air and blasting agent, at least two blasting wheels 6 and a bucket conveyor 7 which is used to return the blasting agent to the blasting wheels 6. As can be seen from FIG. 1, the complete blasting installation 1 extends over several storeys.

Figure 2:
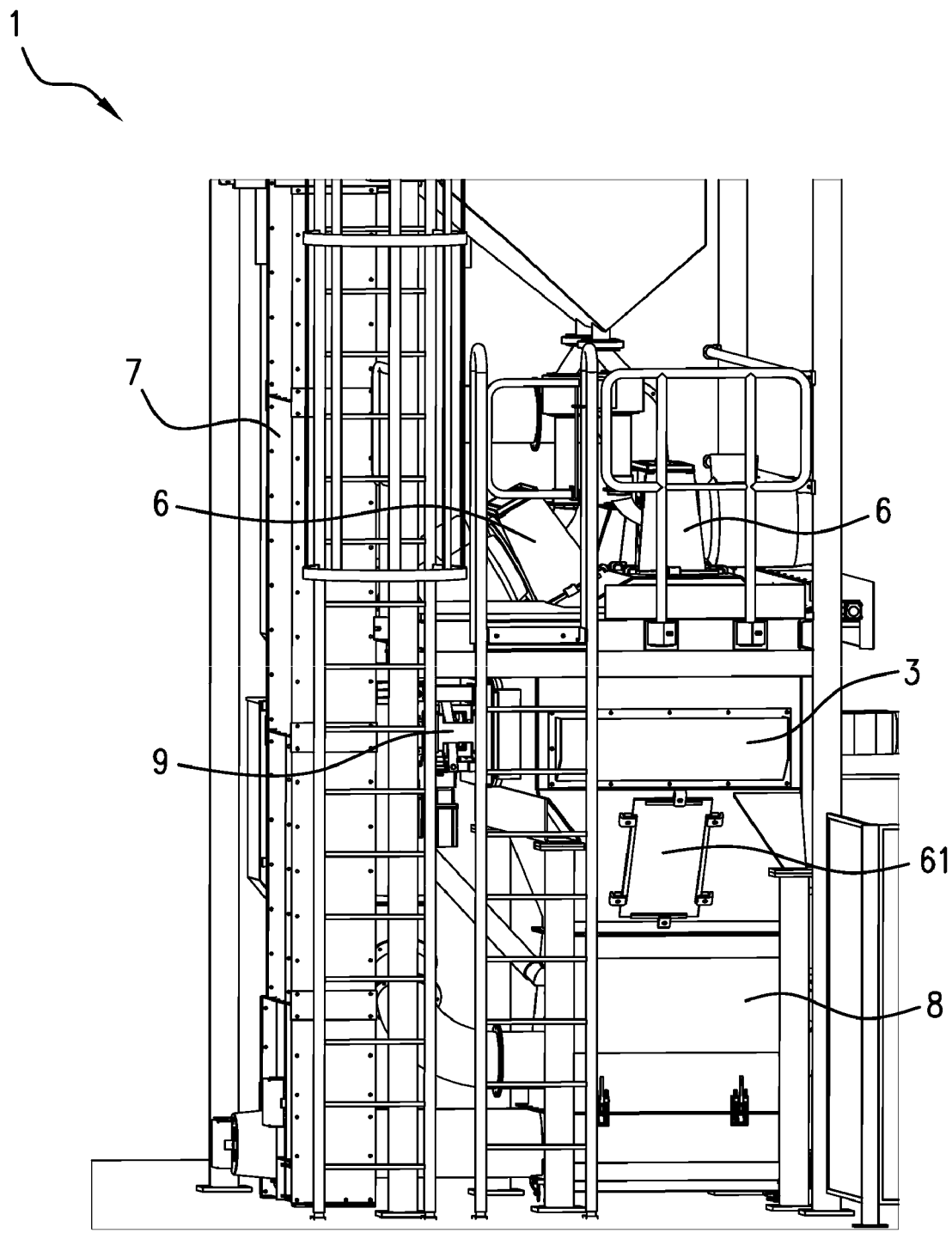
FIG. 2 shows a side view of the blasting installation from FIG. 1.
Figure 3:
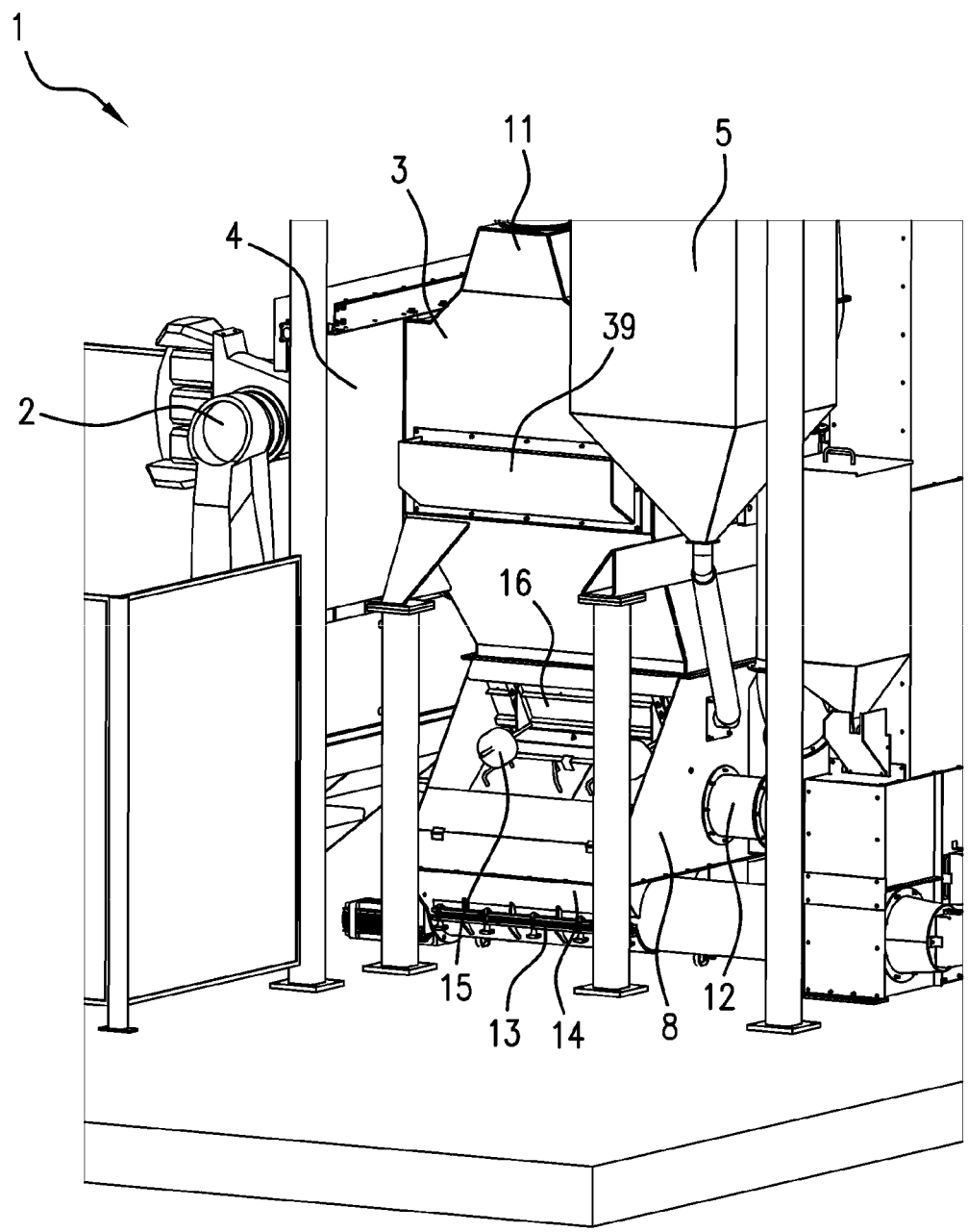
FIG. 3 shows a further side view of the blasting installation from FIG. 1.

FIGS. 2 and 3 provide a detailed illustration of the same blasting installation 1 as that shown in FIG. 1. FIG. 2 illustrates a side view of the blasting installation 1. As well as the bucket conveyor 7 and the blasting wheels 6, FIG. 2 also clearly reveals how a separator 8 is arranged directly beneath the blasting chamber 3. A drive 9, which is used to drive a gripper 10 for handling the cast work pieces within the blasting chamber, can be seen on the rear side of the blasting chamber 3.

FIG. 3 illustrates the lower part of the blasting installation 1 with the separator 8. FIG. 3 shows the blasting installation 1 from the opposite side to that illustrated in FIG. 2. Above the blasting chamber 3 there is a suction means 11 for sucking out the air which is introduced into the blasting chamber 3 via an intake box 39 and other openings and also together with the blasting agent via the blasting wheels 6. A further suction tube 12, which is used to suck the majority of the air out of the blasting installation 1, is arranged on a side wall of the separator 8. A conveyor screw 13, which is used to convey the cleaned blasting agent out of the separator 8, can also be seen beneath the separator 8 in which the mixture of abraded metal and blasting agent is separated.

If the cast materials to be blasted are made from light metal alloys, in particular from magnesium alloys, it is intended to prevent the build-up of accumulations of magnesium dust. The conveyor screw 13 has an outer wall 14 which can be folded down and is divided in two, to allow the conveyor screw 13 to be checked and cleaned as easily as possible. The lower part of the two-part outer wall 14 can be seen in FIG. 3.

FIG. 3 also reveals a counterweight 15 and a rocker 16 which is arranged so as to interact with the counterweight 15. The counterweight 15 is used to allow the supply of solids, in this case the mixture of metal dust and blasting agent, to the pneumatic sifter to be controlled. The metal covering plate of the separator 8 can be removed using a small number of handles, which makes it easier to check for accumulations and to clean the separator 8.

Figure 4:
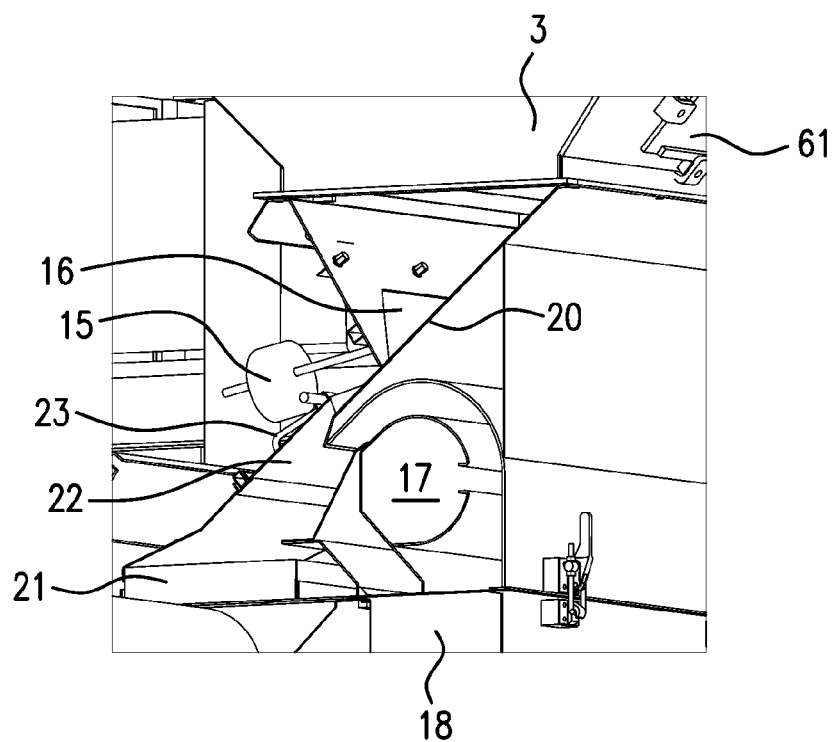
FIG. 4 shows a perspective view of the separator of the blasting installation from FIG. 1.
Figure 5:
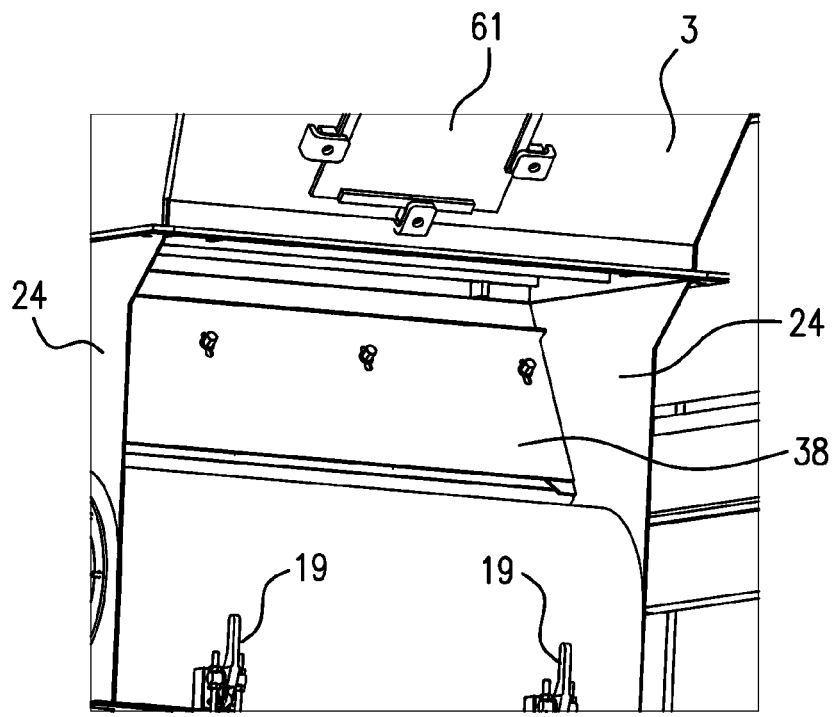
FIG. 5 shows a further perspective view of the separator of the blasting installation from FIG. 1.

FIGS. 4 and 5 show perspective, partially sectional illustrations of the separator 8 in detail. The main air quantity is sucked out of the separator 8 at 17. Beneath the separator 8 is arranged a box 18 in which any entrained coarse pieces are collected. This box 18 is secured to the separator 8 by clamping hooks 19, thereby simplifying the cleaning and checking of the separator 8. The main fraction of the blasting agent and the coarse light metal or magnesium parts which have been removed from the cast work piece by the blasting operation drop off a baffle plate 20 onto a screen 21. The rocker 16 and the counterweight 15 are used to set the flow conditions in the separator 8. The larger the gap between the rocker 16 and the baffle plate 20, the lower the flow velocity in the gap becomes. The baffle plate 20 is arranged between two side walls 24 of the separator 8 and is of the same width as the width of the separator 8 and of the blasting chamber 3. FIG. 5 also reveals an adjustable baffle slide 38 which can be used for rough presetting of the gap between rocker 16 and baffle plate 20. The separator 8 is once again easy to open and check by means of a removable cover 22 with handles 23.

Figure 6:
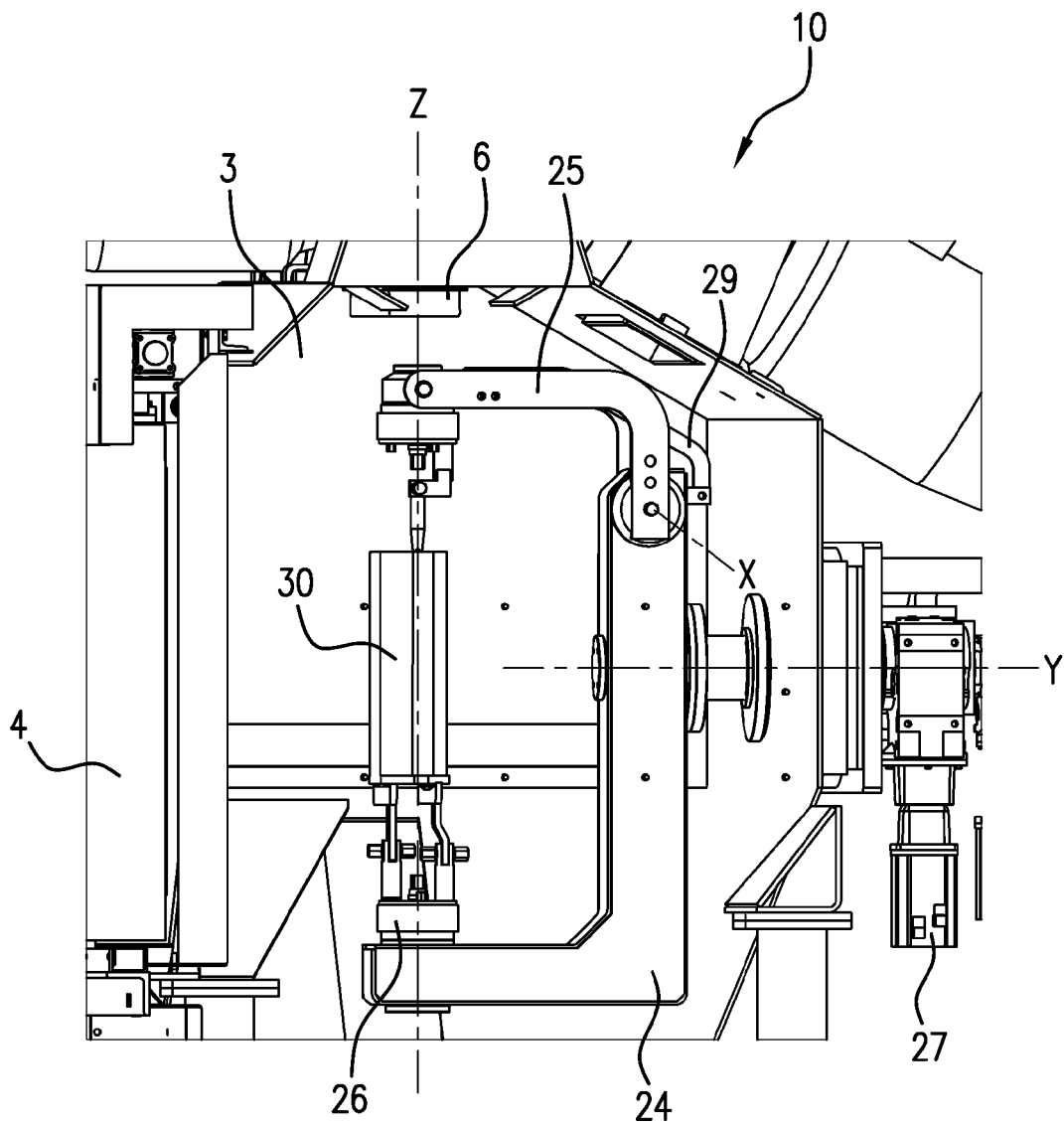
FIG. 6 shows a perspective view into the blasting chamber of the blasting installation from FIG. 1.
Figure 7:
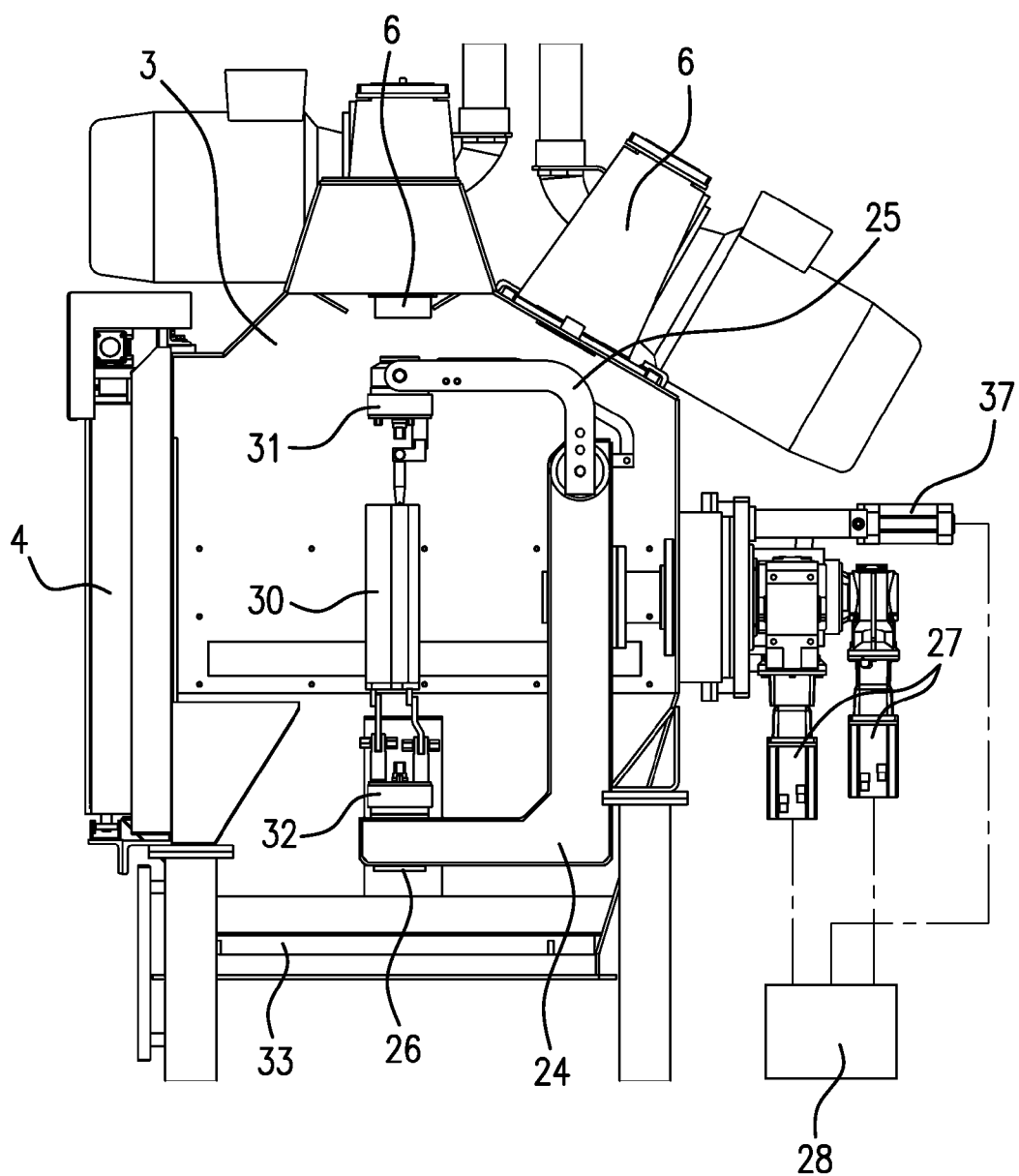
FIG. 7 shows a further view into the blasting chamber of the blasting installation from FIG. 1.

FIGS. 6 and 7 provide a perspective and lateral view of the blasting chamber 3 with the gripper 10 in detail. The gripper 10 comprises a rotary arm 24, a pivot arm 25 and a clamping and rotation device 26. Servomotors 27, which can be seen more clearly in FIG. 7, are used for the rotary movements of the gripper 10. The servomotors 27 are all actuated by a computer 28, allowing positionally accurate movement of the rotary arm 24 and of the clamping and rotation device 26. The rotary arm 24 is substantially L-shaped and internally hollow. The rotary arm 24 can rotate about the Y axis. The pivot arm 25 is connected to the rotary arm 24 such that it can pivot about the X axis. The pivoting movement of the pivot arm 25 is effected by a pneumatic cylinder 37 which acts counter to the closure force of a spring 29, ensuring that the cast work piece, diagrammatically depicted here by a cuboid 30, is held in place in the gripper 10.

The cast work piece is clamped between an upper rotary bearing 31 arranged on the pivot arm 25 and a further, lower rotary bearing 32 arranged on the rotary arm 24. The rotary bearings 31, 32 allow a rotational movement of the cast work piece about the Z axis. The lower rotary bearing 32 is driven by the servomotor 27 via belt drives which are arranged in the cavity of the rotary arm 24.

FIG. 7 also illustrates a metal deflector plate 33 which is arranged at the exit from the blasting chamber 3 to the separator 8. The deflector plates 33 are spaced apart from one another and are each arranged at an angle of 45° to the drop line; they are used to collect the blasting agent as it drops down and to protect the separator, which is arranged beneath the blasting chamber, from abrasion.

The pneumatic cylinders 37 and servomotors 27 which can be actuated by means of computer 28 can be used to move the cast work piece 30 into any position with respect to the blasting agent during the blasting operation and if desired to hold them in position for a shorter or longer time. The use of a computer control together with the servomotors 27 cause the regions of the cast work piece which require more intensive machining with the blasting agent to be moved precisely into the blasting agent jet and held there. The gripper 10 is designed in such a way that it produces the minimum possible blasting shadow on the work piece and thus ensures optimum cleaning of the cast work piece. A third blasting wheel 6 may optionally be secured instead of the plate 61 in the base of the blasting chamber. This allows the work piece 30 that is to be blasted to be blasted over a wider angle.

The separator 8 is designed in such a way that accumulations of dust are prevented and the flow conditions are set in such a way that it is possible to prevent the formation of explosive, ignitable mixtures. The blasting chamber 3 is served by a loading and unloading robot 2 which introduces the cast work pieces 30 into the blasting chamber through the sliding door 4, transfers them to the gripper 10 and removes them again following the blasting process.

The blasting installation 1 is distinguished by a high level of safety with respect to explosions of metal dusts, in particular magnesium dusts, and by ease of cleaning. This is achieved by the fact that all the interior spaces of the installation are easily accessible. The interior spaces and inner surfaces of the separator 8 and of the blasting chamber 3 are of favourable fluid-dynamic design, so as to prevent the formation of accumulations of dust. This is achieved, for example, by rounded corner regions and by space and line cross sections which are suitably adapted to the fluid dynamics of the blasting agent/dust mixture. When blasting magnesium castings, aluminium is used as blasting agent.

The invention claimed is:

1. Shot-blasting installation (1) for blasting work pieces (30) made from light metal alloys, comprising at least one blasting chamber (3) for receiving the work pieces that are to be blasted, at least two blasting wheels (6) arranged in walls of the blasting chamber for introducing a blasting agent into the blasting chamber, and a separator (8) for separating the mixture of blasting agent and material that has been removed by blasting, wherein the separator (8) is arranged directly beneath the blasting chamber (3), and in that a manipulator (10) for handling the cast work piece (30) during blasting is arranged in the blasting chamber, wherein the separator comprises:

a baffle plate (20); and a rocker (16) cooperating with the baffle plate to control a flow of the mixture.

2. Shot-blasting installation (1) according to claim 1, wherein the manipulator is designed as a gripper (30) with three directions of movement.

3. Shot-blasting installation (1) according to claim 1, wherein the gripper (30) is formed with servomotors (27) and pneumatic cylinders (37).

4. Shot-blasting installation (1) according to claim 2, wherein the gripper (10) is connected to a computer system (28) for controlling all the movements of the work piece (30).

5. Shot-blasting installation (1) according to claim 2, further comprising a computer-controlled servomotor (27) for moving the workpiece about a horizontal axis (Y).

6. Shot-blasting installation (1) according to claim 5, wherein the computer-controlled servomotor (27) moved the work piece about a vertical axis (Z).

7. Shot-blasting installation (1) according to claim 1, wherein the baffle plate (20) has a width (B) corresponding to the width (X) of the blasting chamber (3).

8. Shot-blasting installation (1) according to claim 1, wherein the work pieces (30) that are to be blasted are formed from magnesium alloys.

9. Shot-blasting installation (1) according to claim 1, wherein inner spaces and inner surfaces of the separator (8) and of the blasting chamber (3) are formed to prevent accumulations of workpiece dust prevented under prevailing fluid-dynamic conditions.

10. Shot-blasting installation (1) according to claim 1, wherein a loading and unloading robot (2) arranged to load and unload the work pieces (30) that are to be blasted into and from the blasting chamber (3).

11. Shot-blasting installation (1) according to claim 1, wherein the separator further comprises:
a counterweight (15) coupled to the rocker 16 to control a gap between the rocker and the baffle plate to control the flow of the mixture.

12. Shot-blasting installation (1) according to claim 11, wherein the separator further comprises:
an adjustable baffle slide (38) on the rocker, adjustable for a rough presetting of the gap between the rocker and the baffle plate.

13. Shot-blasting installation (1) according to claim 1, wherein the separator further comprises:
an adjustable baffle slide (38) on the rocker, adjustable for a rough presetting of the gap between the rocker and the baffle plate.

14. A shot-blasting installation (1) for blasting work pieces (30) made from light metal alloys, comprising:
at least one blasting chamber (3) for receiving the work pieces that are to be blasted;
at least two blasting wheels (6) arranged in walls of the blasting chamber for introducing a blasting agent into the blasting chamber;
a manipulator (10) in the blasting chamber for handling the work piece (30) during blasting;
a computer system (28) coupled to the manipulator to control the movements of the work piece (30); and
a separator (8) directly beneath the blasting chamber for separating the mixture of blasting agent and material that has been removed by blasting, the separator comprising:
a baffle plate (20) positioned to receive the mixture;
a screen (21) positioned to receive the mixture dropped from the baffle plate; and
a rocker (16) cooperating with the baffle plate to control a flow of the mixture to the screen.

15. An installation according to claim 14 wherein the separator further comprises:
a baffle slide (38) on the rocker adjustable to provide a rough presetting of a gap between the rocker and the baffle plate; and
a counterweight (15) on the rocker adjustable to set a flow condition of the mixture through the gap.

16. An installation according to claim 14 wherein the separator further comprises:
a conveyor screw (13), positioned to convey the cleaned blasting agent out of the separator.

17. A method for blasting cast work pieces (30) made from light metal alloys, comprising:
with a robot (2), introducing a said cast work piece (30) into at least one blasting chamber (3);
with the robot, transferring the work piece to a manipulator (10);
with at least two blasting wheels (6), introducing a blasting agent into the blasting chamber to blast the work piece;
with the manipulator, handling the work piece (30) during the blasting
with the robot, removing the work piece following the blasting
with a separator (8), directly below the chamber, separating the mixture of blasting agent and material that has been removed by blasting, the separating comprising:
dropping the mixture off a baffle plate (20) onto a screen (21); and
with a rocker (16) cooperating with the baffle plate, controlling a flow of the mixture to the screen.

18. The method of claim 17 further comprising:
adjusting a baffle slide (38) to provide a rough presetting of a gap between the rocker and the baffle plate; and
adjusting a counterweight (15) to set a flow condition of the mixture through the gap.

19. The method of claim 17 further comprising:
with a conveyor screw (13), conveying the cleaned blasting agent out of the separator.

20. The method of claim 17 wherein:
a computer system (28) controls the manipulator to rotate the work piece about two axes during the blasting.

* * * * *